Feb. 17, 1959   J. H. CRANKSHAW   2,873,588
FLEXIBLE COUPLING
Filed Sept. 19, 1955

INVENTOR.
John H Crankshaw
BY
Charles L. Lowenheck
attorney

United States Patent Office 2,873,588
Patented Feb. 17, 1959

2,873,588

FLEXIBLE COUPLING

John H. Crankshaw, Erie, Pa., assignor to American Flexible Coupling Company, Erie, Pa., a corporation of Pennsylvania Application September 19, 1955, Serial No. 534,912

3 Claims. (Cl. 64—9)

This invention relates to couplings and more specifically to couplings for use in connecting two shafts which are axially misaligned and functions equally well in eliminating end play between shafts operating in alignment.

Frequently in the use of flexible couplings for connecting a drive shaft to a driven shaft, a problem exists in preventing the shafts from moving axially toward and away from each other. Further, the fluctuation of the load frequently results in axial vibration of the couplings. The coupling described herein has been designed to eliminate end play between two shafts.

In general, the coupling disclosed herein operates like an ordinary gear coupling. Each of the hubs transmits its rotation through its teeth to the internal teeth on one of the sleeves. The sleeves bolted together rotate in unison, transmitting rotation through the internal teeth of the sleeve to the external teeth of the output or driven hub. When the driving shaft and driven shaft rotate in one direction, the action of the hub teeth on the internal teeth causes the hubs to cam inward together and causes the spherical thrust members to engage each other to maintain the spacing and the rotation of the driving member in the opposite direction will cause the hubs to cam outward.

It is, accordingly, an object of this invention to provide a coupling member for misaligned shafts which is simple in construction, economical to manufacture, and efficient in operation.

Another object of the invention is to provide a gear type coupling which will eliminate end play between two shafts.

Another object of this invention is to provide a gear type coupling for transmitting torsional forces between two misaligned shafts wherein a member having internal helical teeth disposed at an angle to each other is adapted to engage a pair of hub teeth having helical teeth mating with the internal helical teeth whereby two spherical spacer members are caused to engage each other.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
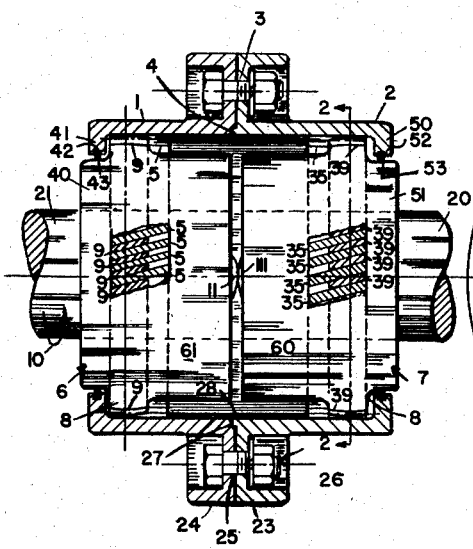
Fig. 1 is a cross sectional view of a coupling taken on line 1—1 of Fig. 2.
Figure 2:
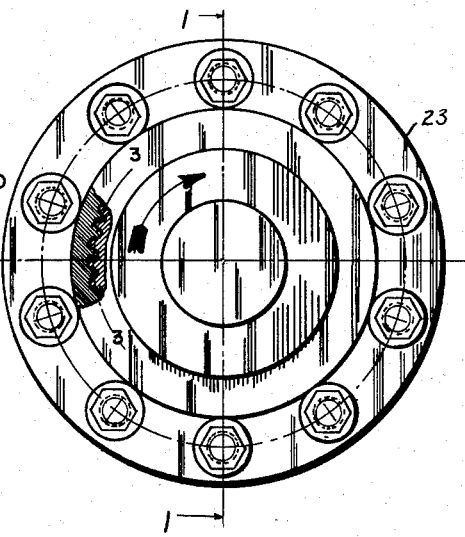
Fig. 2 is an end view of the coupling according to the invention partly in section taken on line 2—2 of Fig. 1.

Now with more specific reference to the drawing, a drive shaft 20 is shown adapted to drive a driven shaft 21. Two sleeve members 1 and 2 have outwardly extending flanges 23 and 24 which have spaced holes 25 therein adapted to receive bolts 26 which hold the sleeves 1 and 2 in positive relation to each other. The sleeve member 1 may have an internal peripheral groove 27 which mates with a peripheral shoulder 28 on the sleeve 2 to hold the sleeves 1 and 2 in alignment. Internal teeth 35 are formed on the inner periphery of the sleeve 2 and similar teeth 5 are formed on the inner periphery of the sleeve 1.

A hub 6 has spaced crowned teeth 9 on the outer periphery thereof and the teeth 9 are adapted to engage the internal helical teeth 5 on the sleeve 1. A hub 7 has spaced outer peripheral teeth 39 on the outer periphery thereof which are adapted to mate with the internal teeth 35. The hub 6 has a flanged shoulder 40 extending outwardly from the teeth 9 and the sleeve 1 has an inwardly directed flange 41 having an internal peripheral groove 42 thereon which receives an O-shaped ring 43. The O-shaped ring 43 engages the outer periphery of the flanged shoulder 40, thereby providing a seal against leakage of grease from the coupling and dust therebetween and also allowing a limited amount of relative axial movement between the sleeve 1 and the hub 6. The sleeves 2 likewise has an inwardly directed flange 50 having an internal peripheral groove 52 which receives an O-shaped packing ring 53. The O-shaped packing ring 53 is adapted to ride on the outer periphery of a shoulder 51 on the hub 7.

The hub 7 has an axially extending shoulder 60 which terminates at the center in a generally flat surface having a thrust member 111 which is generally shaped to conform to a portion of a sphere. An inwardly extending shoulder 61 on the hub 6 likewise has a thrust member 11 formed on the end thereof which is generally in the shape of the portion of a sphere. The members 11 and 111 are adapted to engage each other.

When a driving means such as an engine is attached to the shaft 20 and a driven machine attached to the shaft 21 and the shaft 21 driven in the direction of arrow 10, the hub teeth 9 acting against the internal teeth 5 on the sleeve 1 tend to cam the hub 6 toward the center of the coupling. Likewise, he internal teeth 35 of the sleeve 2 act against the teeth 39 and tend to cam the hub 7 toward the center of the coupling. This tendency to move together continues until the member 11 engages the spherical member 111 and, at this point, the hubs 6 and 7 are held in spaced relation by the member 11 and the member 111. Therefore, when the shaft 21 is driven in the direction of the arrow 10, there will be a sliding movement between the internal teeth 5 and the external teeth 9 and between the internal teeth 35 and the external teeth 39 and the spherical member 11 will roll around on the spherical member 111 as the two shafts 20 and 21 rotate in axial misalignment. If the driven shaft 21 overdrives or if the shaft 21 is driven in a direction opposite to the direction of the arrow 10, then the hubs 6 and 7 will be cammed outwardly until the ends of the teeth 9 engage the flange 41 which will maintain the shafts 20 and 21 in the proper spaced relation to enable them to operate in misalignment without the ends of the shoulders 60 and 61 interfering.

The helix angle of the gear teeth 5, 9, 35, and 39 will be increased or decreased to suit the particular application or the helix angle may be reversed to create outward thrust. In either case, the thrust tendency of the helical hubs 6 and 7 is to hold the sleeve members 1 and 2 centralized; that is, to hold the two hub members 6 and 7 in symmetrical relation to their respective sleeve member.

In referring to crowned toothed gears, reference is made to gears having the flanks thereof formed in a curved fashion. That is, the flanks will have a curve superimposed thereon and the tips of the teeth define the surface of a sphere. For example, they may be crowned in the manner shown in Patent No. 2,682,760. The tips of the teeth are also crowned to conform to the surface of a sphere.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling for transmitting torque between two shafts having the axes thereof disposed at an angle to each other, said coupling comprising a sleeve member having two spaced sets of internal helical teeth disposed at an angle to each other, a hub having crowned helical teeth thereon mating with each said set of internal teeth, one said hub being attached to a drive member and the other said hub being attached to a driven member, said hubs being adapted to slide toward each other when one hub is driven in a first direction, and means to hold said hub members in spaced relation to each other, said means comprising a spherical shaped member on the end of each said hub adjacent each other, said spherical members adapted to engage each other whereby the axial movement of said shafts is limited.

2. A coupling for transmitting torque between two shafts having the axes thereof disposed at an angle to each other, said coupling comprising a sleeve member having two spaced sets of internal helical teeth disposed at an angle to each other, a hub having crowned helical teeth thereon mating with each said set of internal teeth, one said hub being attached to a drive member and the other said hub being attached to a driven member, a spherical shaped centrally disposed member on the inner end of each said hub member engaging the spherical member on the other said hub member whereby the movement of said hub members toward each other is limited and when one said hub is driven in one direction, said hubs are held in spaced relation to each other as said hubs are urged toward each other, each said sleeve having a flange overlying said hubs outwardly of said hub teeth, and an inwardly directed flange attached thereto adapted to engage the outer edges of said teeth to limit the movement of said hubs away from each other.

3. The coupling recited in claim 2 wherein each said hub has a flange extending axially outwardly from said teeth thereon and sealing means is provided between said sleeve flange and said hub flange.

References Cited in the file of this patent

UNITED STATES PATENTS

| 759,726 | Maxim | May 10, 1904 |
| 2,271,060 | Case | Jan. 27, 1942 |
| 2,380,113 | Kuhns | July 10, 1945 |

FOREIGN PATENTS

| 16,189 | Great Britain | Aug. 28, 1893 |